May 20, 1952     E. E. HOSEA     2,597,328

HEADSTOCK MOUNTING

Filed Dec. 4, 1947     6 Sheets-Sheet 1

INVENTOR
Everett E. Hosea
By Carlson, Pitzner, Hubbard & Wolf
ATTORNEYS

May 20, 1952 E. E. HOSEA 2,597,328
HEADSTOCK MOUNTING
Filed Dec. 4, 1947 6 Sheets-Sheet 2

INVENTOR
Everett E. Hosea
By Carlson, Pitzner, Hubbard & Wolfe
ATTORNEY

May 20, 1952  E. E. HOSEA  2,597,328
HEADSTOCK MOUNTING
Filed Dec. 4, 1947  6 Sheets-Sheet 3

INVENTOR
Everett E. Hosea
By Carlson, Pitzner, Hubbard & Wolfe
ATTORNEYS

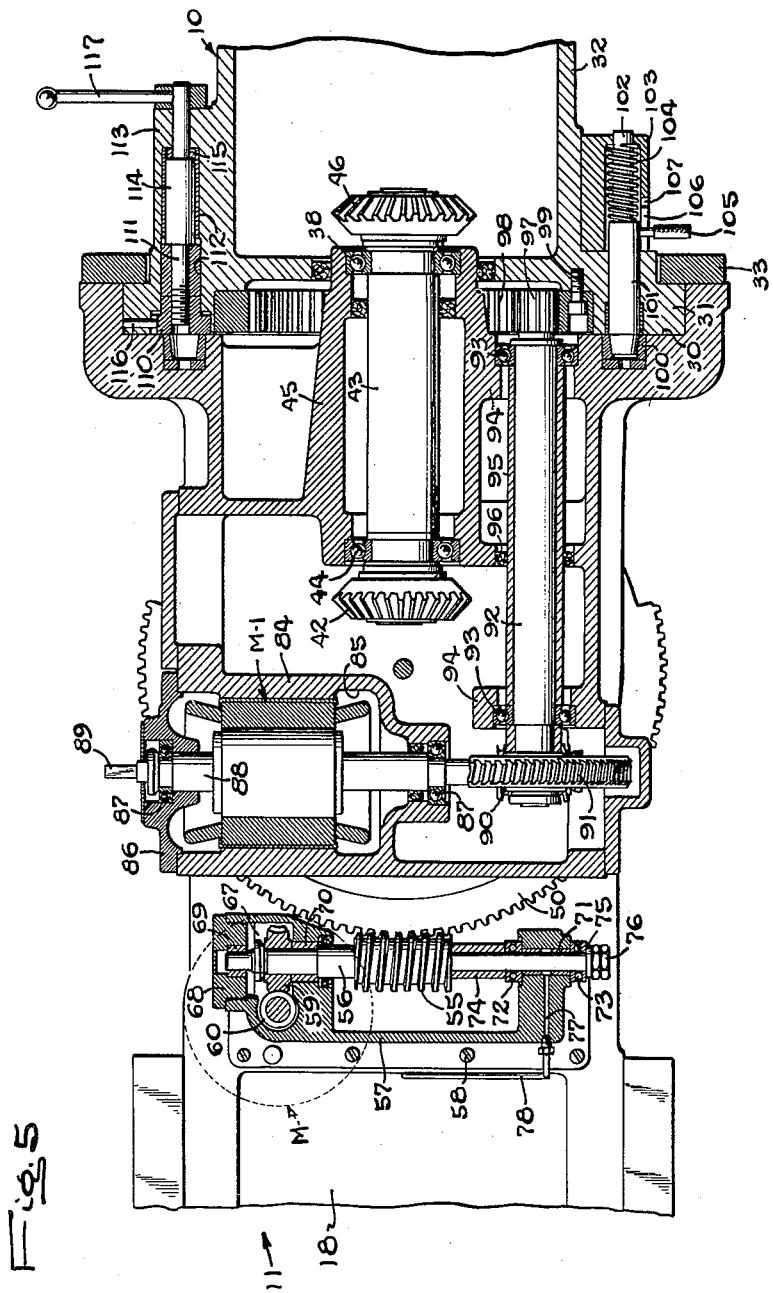

May 20, 1952 E. E. HOSEA 2,597,328
HEADSTOCK MOUNTING
Filed Dec. 4, 1947 6 Sheets-Sheet 5
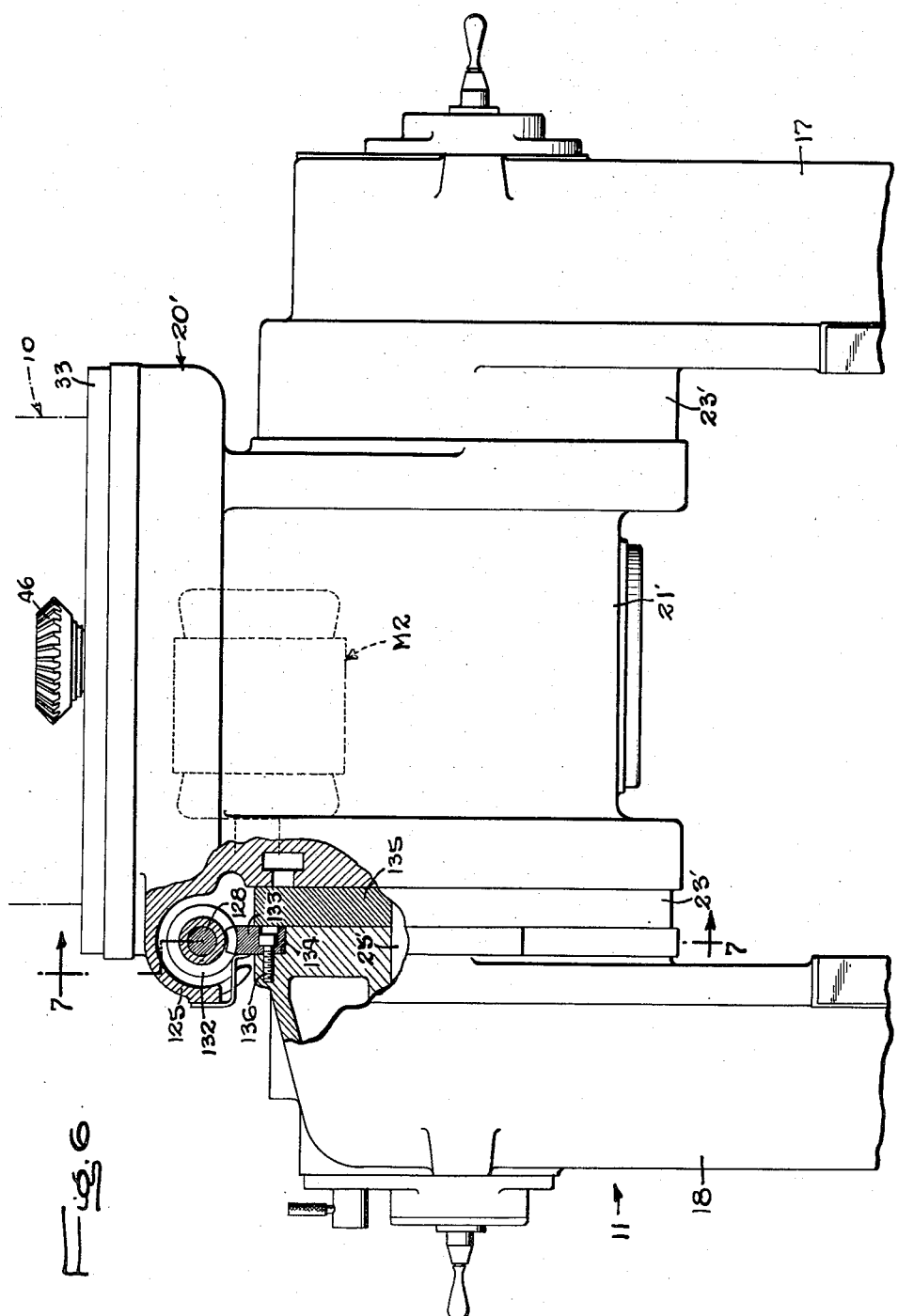
INVENTOR
Everett E. Hosea
By Carlson, Pitney, Hubbard & Wolfe
ATTORNEY May 20, 1952 — E. E. HOSEA — 2,597,328
HEADSTOCK MOUNTING
Filed Dec. 4, 1947 — 6 Sheets-Sheet 6
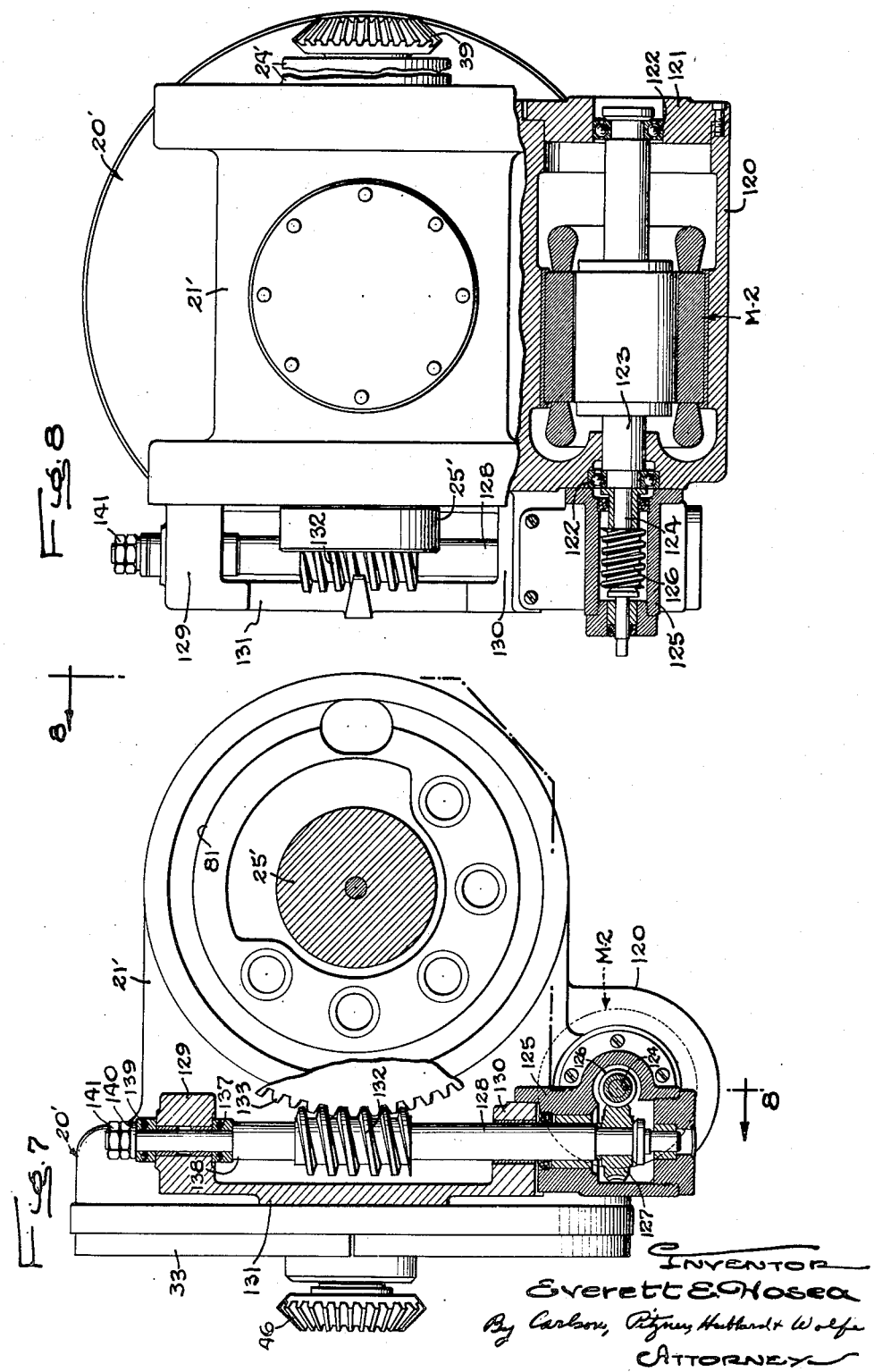

Patented May 20, 1952

2,597,328

UNITED STATES PATENT OFFICE 2,597,328

HEADSTOCK MOUNTING

Everett E. Hosea, Kaukauna, Wis., assignor to Kaukauna Machine Corporation, Kaukauna, Wis., a corporation of Wisconsin Application December 4, 1947, Serial No. 789,592

4 Claims. (Cl. 90—17)

1

The invention relates to swivel mountings for machine tool headstocks and has for its primary object the provision of an improved swivel mounting embodying power driven means for adjusting the mounting to variably position the headstock.

Another object is to provide a power actuated swivel mounting which affords quick and accurate adjustment of a heavy machine tool headstock with a minimum of physical effort on the part of the operator, and which permits such adjustment to be effected from a point remote from the headstock.

It is also an object of the invention to provide a power actuated headstock mounting in which the moving parts and wearing surfaces are effectually enclosed and which, while simple in construction and very compact, provides a wide range of headstock adjustments.

Other objects and advantages of the invention will become apparent from the following detailed description of the preferred embodiments illustrated in the accompanying drawings, in which:

Fig. 5 is a sectional view taken in a vertical plane substantially on the line 5—5 of Fig. 3.

Fig. 6 is a plan view of a modified form of headstock swivel mounting.

Fig. 7 is a sectional view taken in a vertical plane substantially on the line 7—7 of Fig. 6.

Fig. 8 is a sectional view taken in offset vertical planes substantially on the line 8—8 of Fig. 7.

Figure 1:
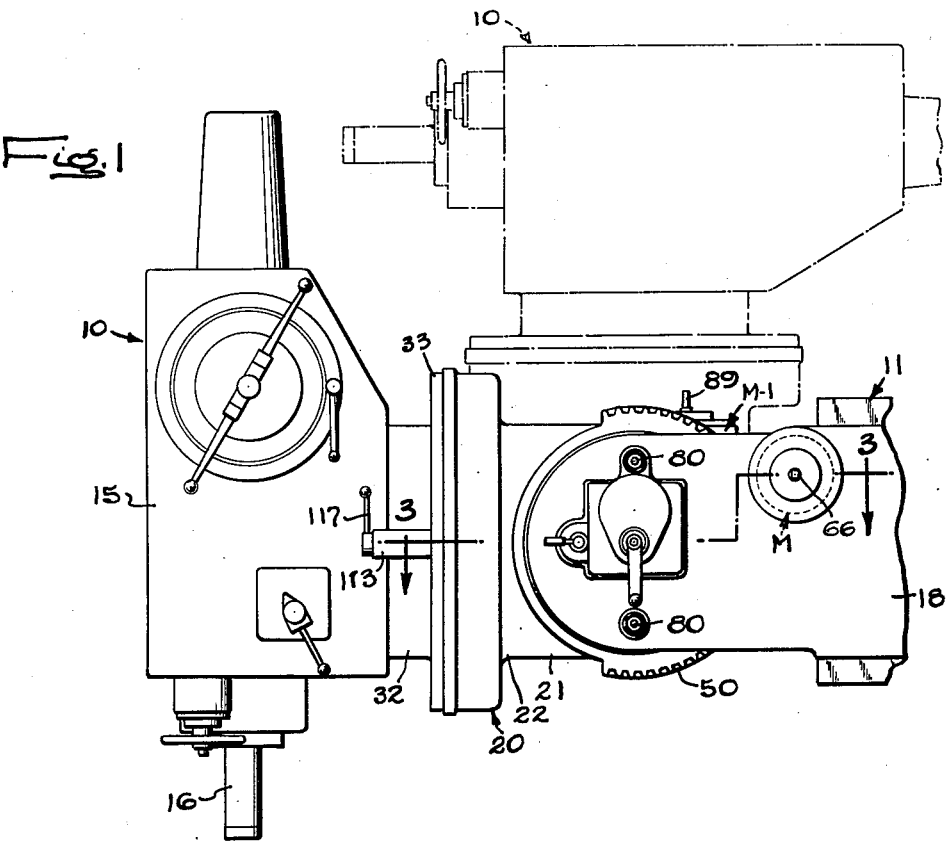
Figure 1 is a side view of a machine tool headstock and associated swivel mounting embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 3:
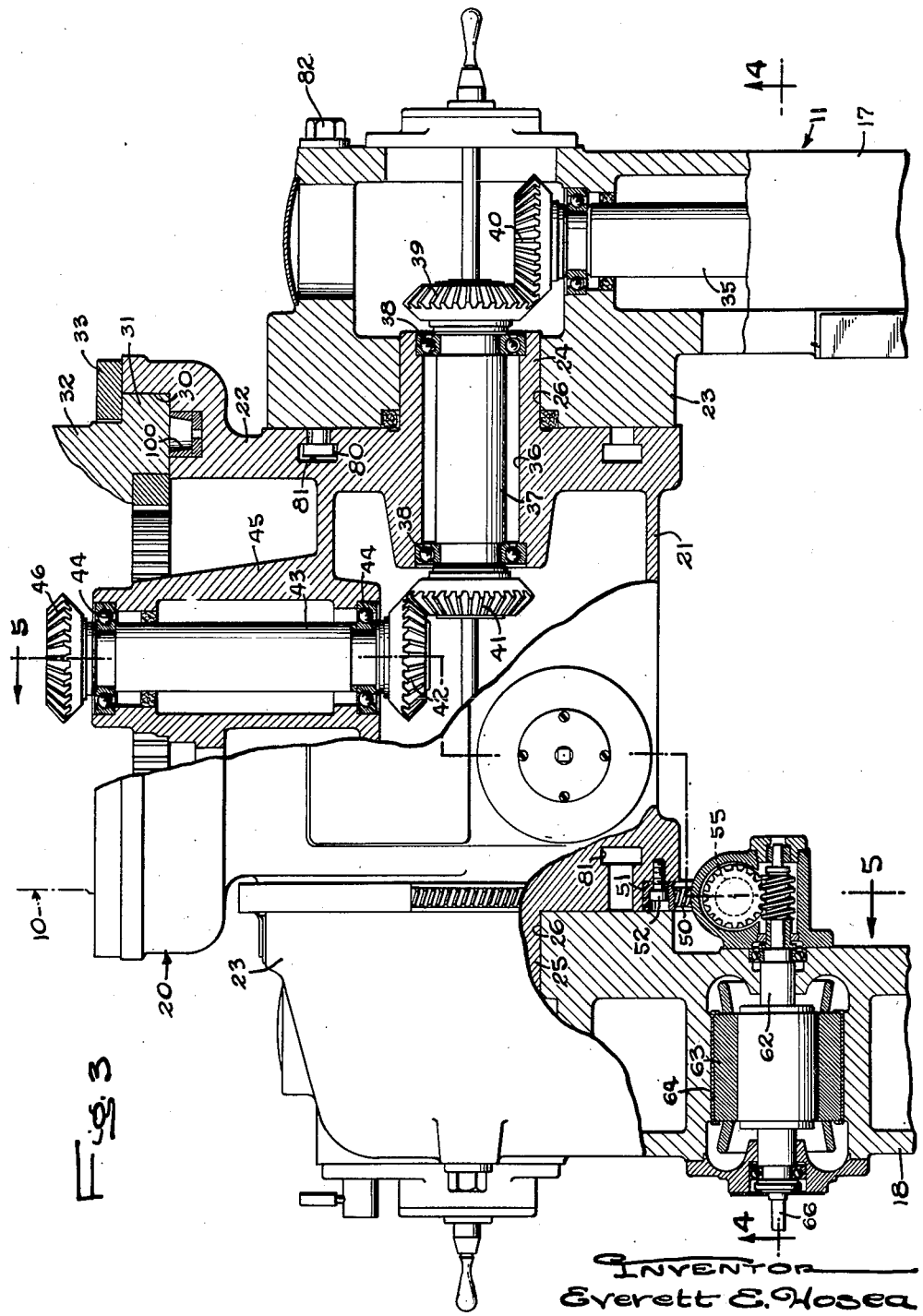
Fig. 3 is a sectional view of the swivel mounting taken in offset horizontal planes substantially on the line 3—3 of Fig. 1.
Figure 4:
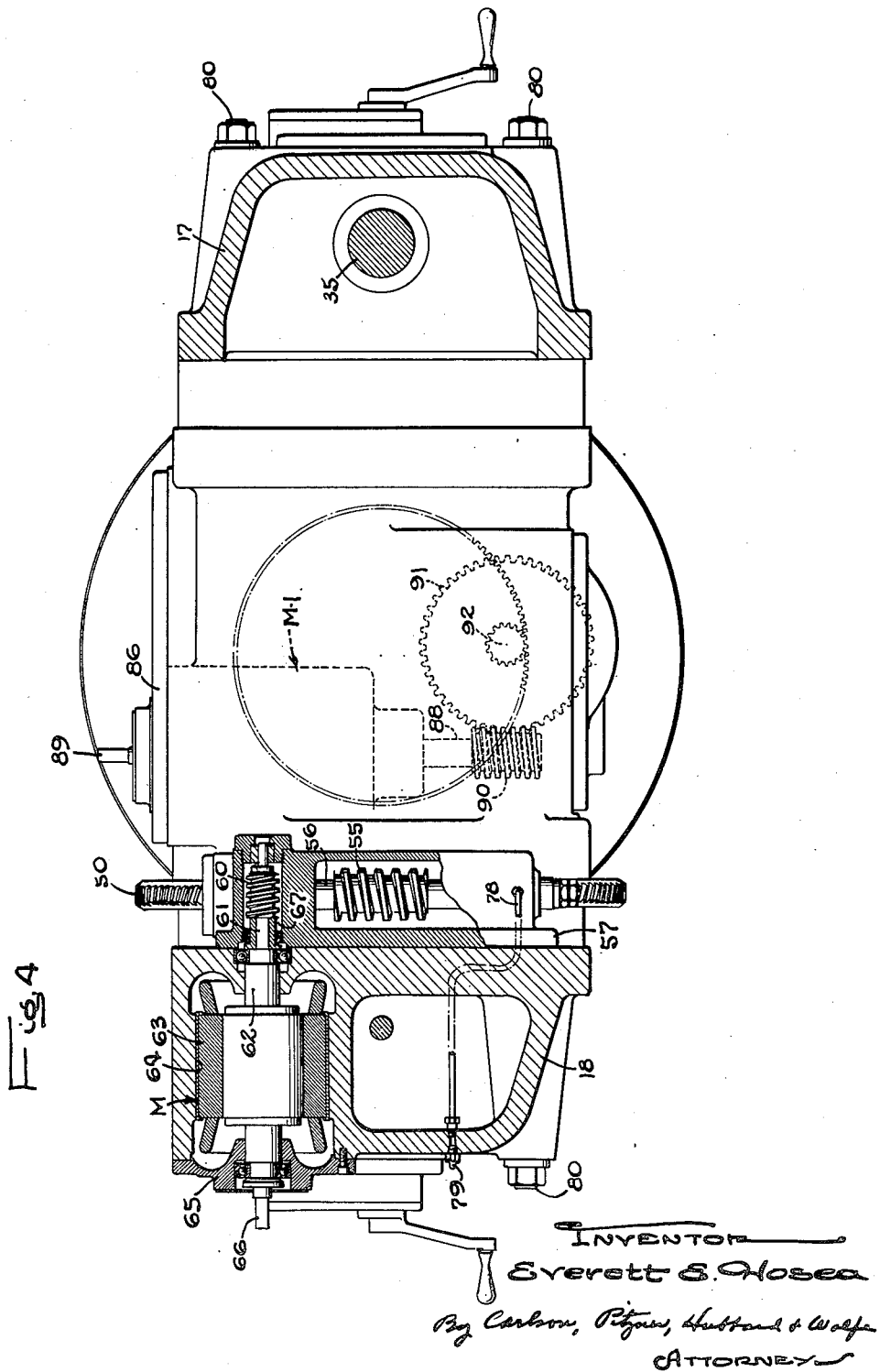
Fig. 4 is a sectional view taken in a vertical plane substantially on the line 4—4 of Fig. 3.

For purposes of illustration, the improved swivel mounting constituting the present invention has been shown as installed for supporting a headstock 10 on a rigid member 11 constituting a part of the frame structure of a machine tool. The headstock 10 may be of any preferred type and comprises a generally rectangular casing 15 in which is supported a rotatably driven and axially shiftable tool supporting spindle 16. The member 11 is shown in the form of a horizontally disposed rail, and may constitute the crossrail of a machine tool, such as the boring, drilling and milling machine disclosed in my copending application Serial No. 685,527, filed July 22, 1946. As shown in Figs. 3 and 4 of the drawings, the particular rail illustrated is made up of two elongated side members 17 and 18 of hollow box-type construction assembled in parallel spaced relation.

In its preferred form, the improved swivel mounting includes a trunnion fixture 20 comprising a hollow rectangular body 21 merging at one end into a cylindrical extension or neck portion 22. The body 21 has its opposite sides finished to provide flat parallel bearing surfaces adapted to fit between the side members 17 and 18 of the rail, which members are formed with suitable pads 23 for engaging the bearing surfaces of the body. Pivotal support for the fixture 20 is provided by trunnions 24 and 25 projecting from the finished sides of the body 21 and received in recesses 26 formed in the pads 23 of the rail members. The trunnion fixture may thus be rocked about an axis perpendicular to the longitudinal axis of the rail 11.

For supporting the headstock 10, the neck portion 22 of the trunnion fixture 20 is formed at its outer end with a cylindrical recess 30 constituting a socket for the accommodation of a supporting element carried by the headstock. In the present instance, the supporting element is in the form of an annular flange 31 formed on a cylindrical extension 32 rigid with and projecting from the rear wall of the headstock casing 15. A retaining ring 33 secured to the neck portion of the trunnion fixture and overlying the marginal edge portion of the flange 31 holds the parts in assembled relation while permitting the flange 31 to turn in the recess 30, whereby the headstock may be rotated bodily about an axis perpendicular to the pivotal axis of the trunnion fixture 20.

In the particular machine organization illustrated, power for driving the spindle 16 is transmitted through the trunnion fixture 20 from a shaft 35 extending longitudinally of and journaled in the rail member 17. For this purpose, the trunnion 24 is formed with a bore 36 for the accommodation of a shaft 37 which is supported therein by antifriction bearings 38 with its rotational axis coincident with the pivotal axis of the fixture. The shaft 37 is provided at one end with a bevel gear 39 drivingly engaged by a bevel gear 40 on the drive shaft 35. A bevel gear 41 on the other end of the shaft 37 engages a bevel gear 42 fast on a shaft 43 supported with its axis coincident with the swiveling axis of the headstock 10 in the socket recess 30. The shaft 43 is journaled in antifriction bearings 44 carried by a sleeve member 45 formed integrally with the trunnion fixture 20 and disposed centrally within the neck portion 22 of the fixture. A bevel gear 46 on the outer end of the shaft 43 provides a driving connection with the spindle rotating and feeding trains within the headstock.

To afford quick and easy adjustment of the headstock 10 to locate the spindle 16 in any desired angular position, means is provided for rocking the trunnion fixture 20 about its pivotal axis and for rotating the headstock 10 bodily relative to the fixture. While the power for effecting such adjustments may be derived from the spindle drive mechanism or other drive mechanisms in the machine tool if desired, it is preferred for ease and accuracy of control to utilize individual electric motors for imparting the adjusting movements to the trunnion fixture and the headstock. These motors may be conventional reversible electric motors of the type commonly known as torque motors which have a high starting torque and which can be stalled without danger of overheating.

Figure 2:
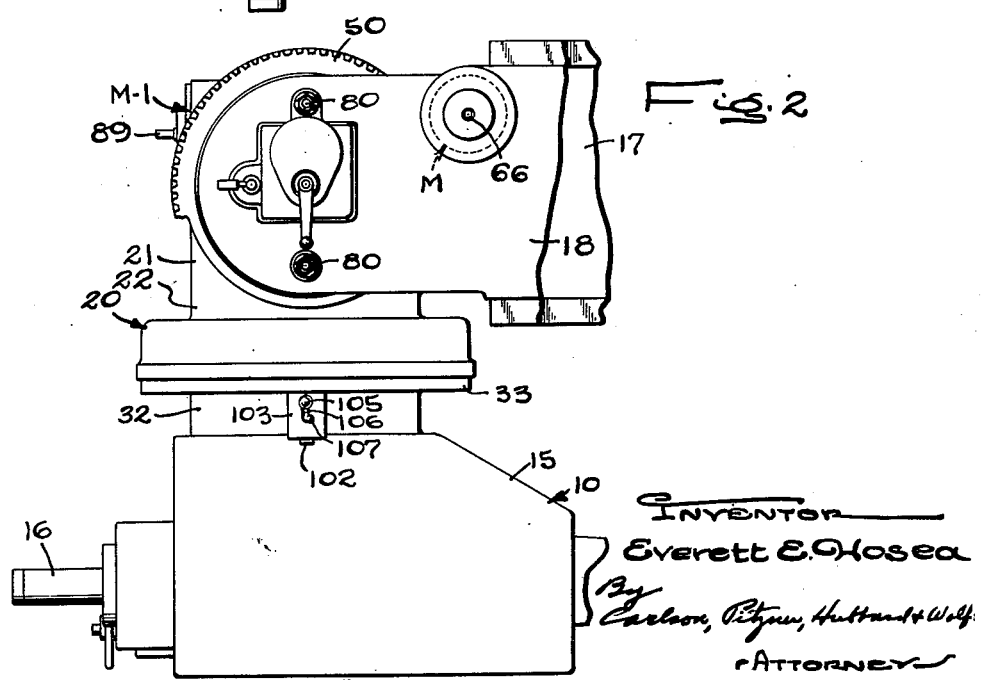
Fig. 2 is a side view of the headstock and swivel mounting showing the headstock adjusted to a horizontal position below the point of support.

Adjustment of the trunnion fixture 20 on its pivotal axis is effected through the medium of a worm wheel 50 (Figs. 1–3 and 5) mounted on the fixture with its axis coincident with the pivotal axis. The gear 50 which is preferably in the form of an annulus, is seated in a recess 51 formed in the fixture body 21 on the same side as the trunnion 25 and may be secured to the fixture body in any suitable manner, as by machine screws 52. In the exemplary body, the teeth of the gear 50 extend only slightly more than half way around its peripheral edge so as to provide for turning the trunnion fixture through an arc of 180° between the upper horizontal position shown in broken lines in Fig. 1 and the lower horizontal position shown in full lines in Fig. 2.

Coacting with the worm gear 50 is a worm 55 (Figs. 4 and 5) formed on or rigidly secured to a vertically disposed shaft 56 rotatably supported on the rail 11. Support for the shaft 56 is provided, in this instance, by a bracket 57 which is removably secured to the inner face of the rail member 18, as by cap screws 58. The shaft 56 has a worm wheel 59 keyed thereto for cooperation with a worm 60 fast on an extension 61 of the shaft 62 of a reversible electric motor M.

To conserve space and simplify construction, the motor M is built into the rail member 18, that is, its stator 63 is fitted into a recess 64 in the rail member and its shaft 62 is journaled in antifriction bearings carried respectively by the rail member and by a cap 65 removably secured over the outer end of the recess 64. Preferably, the outer end of the shaft 62 is extended as at 66 and squared for the reception of a wrench or crank, whereby the adjusting mechanism may be actuated manually when required.

As will be seen by reference to Figs. 4 and 5 of the drawings, the bracket 57 is constructed so as to partially enclose the worm 55 and to provide a chamber 67 completely enclosing the worm wheel 59 and its associated worm 60. This chamber is closed by a screw-threaded plug 68 having a recess in its inner face for a bearing 69 journaling the upper end of the shaft 56. A bearing 70 on the other side of the chamber 67 provides support for the shaft intermediate its ends. The plug 68 is located so that it is readily accessible from the top of the rail 11 and is easily removed so that the chamber 67 may be filled with oil or grease to lubricate the worm and worm wheel and the adjacent shaft bearings.

At its lower end the shaft 56 is journaled in a bearing 71 seated in the lower wall of the bracket 57 and suitable thrust bearings 72 and 73 are provided on opposite sides of the wall for taking the end thrust of the shaft when it is rotated to turn the trunnion fixture in either direction. As shown in Fig. 5, the thrust bearing 72 is confined between the inner face of the bracket wall and a sleeve 74 fitted over the shaft and bearing against the lower end of the worm 55. The bearing 73 is confined between the outer face of the bracket wall and a collar 75 held against axial movement on the shaft by a lock nut assembly 76 threaded on the lower end of the shaft. To facilitate lubrication of the bearings 71—73, the bracket 57 is formed with a lubricant duct 77 connected by a conduit 78 with a conventional grease gun fitting 79 accessible at the front of the rail member 18, as shown in Fig. 4.

Provision is made for rigidly clamping the trunnion fixture 20 in adjusted position during machining operations. As herein shown, such clamping is effected by means of T-headed bolts 80 (Fig. 3) extending through holes in the side members 17 and 18 of the rail 11 and engaging in annular T-slots 81 formed in the sides of the fixture body 21. The outer ends of the bolts are threaded for the reception of nuts 82 by which the bolts may be drawn up tight or released, as required.

Power for rotating the headstock 10 relative to the fixture 20 is supplied by a reversible electric motor M-1 (Figs. 4 and 5) enclosed within the fixture body 21. Preferably the body 21 is formed with an internal wall or partition 84 (Fig. 5) defining a motor chamber 85 opening through the top wall of the body. This chamber is closed by a removable cap 86 which carries an antifriction bearing 87 for rotatably supporting one end of the motor shaft 88, the other end being similarly supported by a bearing 87 carried by the partitioning wall 84. The outer end of the shaft 88 is extended through the cap and squared as at 89 for the reception of the wrench or hand crank by which the shaft may be turned manually.

The inner end of the shaft 88 extends through the partitioning wall 84 and is provided with a worm 90 (Fig. 4) coacting with a worm wheel 91 keyed to a shaft 92 which is rotatably supported in the fixture body with its axis parallel to the rotational axis of the headstock 10 and drivingly connected with the latter. As shown in Fig. 5, the shaft 92 is journaled in antifriction bearings 93 seated in transverse internal webs 94 formed in the body 21. A spacing sleeve 95 fitted over the shaft 92 between the bearings and coacting with a packing ring 96 sealed within the body 21 prevents leakage of lubricant from the interior of the fixture body.

The driving connection between the shaft 92 and the headstock 10 is provided, in this instance, by a pinion 97 rigid with the shaft and coacting with an internal gear 98 mounted on the headstock casing extension 32 coaxial with the supporting flange 31. In the exemplary machine, the gear 98 is separately formed and is removably secured to the headstock extension, as by machine screws 99. Rotation of the shaft 92 is therefore effective to rotate the headstock 10 relative to the trunnion fixture 20 and thus adjust the angular position of the tool spindle 16.

Means is desirably provided for locating the headstock in certain commonly used angular positions whereby accurate adjustment to such positions is facilitated. For this purpose the bearing recess 30 of the trunnion fixture is formed with a series of bushed locating recesses 100 adapted to receive the tapered nose of a locating plunger 101 slidable in an aperture in the flange 31 of the headstock.

As shown in Fig. 5, the plunger 101 is formed at its outer end with an extension 102 of reduced diameter, which projects through and is guided by a sleeve-like member 103 rigidly secured to the flange 31. A compression spring 104 interposed between the end of the sleeve member and the shoulder presented adjacent the reduced portion of the plunger urges the latter into the recess 100. The plunger may be withdrawn to release the headstock for adjustment by means of a radially projecting pin 105 which extends through a longitudinal slot 106 in the member 103. At its outer end the slot 106 is offset to provide a notch 107 in which the pin 105 may be seated to latch the plunger in withdrawn position. Similar locating means may be provided for the trunnion fixture 20.

Provision is made for clamping the headstock in adjusted positions of the trunnion fixture during machining operations. The clamping means in its preferred form comprises a friction shoe 110 having a central aperture threaded for the reception of a manually operable screw by which it may be forced into clamping engagement with the bottom face of the recess 30. As herein shown, the shoe 110 is seated in a counterbore in the flange 31 opening into a stepped bore 112 extending through the flange and through a lateral projection 113 of the headstock extension 32. The intermediate section of the bore 112 is bushed for the accommodation of an enlarged portion 114 of the screw 111 which presents an axial facing shoulder engageable with a thrust washer 115 seated in the section 112 of the bore to restrain the screw against axial movement. A stationary pin 116 engaging in a slot in one side of the shoe 110 holds the shoe against rotation. Accordingly, the shoe may be shifted axially toward or from the trunnion fixture by appropriate rotation of the screw 111. Such rotation of the screw is effected through the medium of a hand lever 117 fixed on the projecting end of the screw.

As the power for effecting the foregoing adjustments of the headstock is supplied by the motors M and M-1, the machine attendant is relieved of the physical effort required to shift this heavy machine element. Adjustments may therefore be made more rapidly with corresponding reduction in idle machine time, whereby the over-all efficiency of the machine is substantially increased. Moreover, the adjusting motors may be readily controlled from a remote point, as, for example, by means of switches mounted on a conventional pendant-type control panel. This permits the adjustments to be made while the tool and work are kept under close observation by the attendant and accurate adjustment is thus facilitated.

The modified form of swivel mounting illustrated in Figs. 6–8 of the drawings differs from that heretofore described primarily in that the motor M-2 for rocking the trunnion fixture 20' on its pivot is enclosed within the fixture body 21'. The particular fixture shown is arranged for manual adjustment of the headstock on the trunnion fixture, but it will be appreciated that power-driven adjusting means similar to that above described may be provided if desired. As in the other form, the fixture 20' is supported for pivotal movement between the rail members 17 and 18 by trunnions 24' and 25' projecting at opposite sides of the fixture body 21'. The clamping and locating means may be similar to that heretofore described.

For accommodating the motor M-2, the fixture body 21' is formed at one side with a generally cylindrical housing 120 having one end closed by a removable cover plate 121. Antifriction bearings 122 carried respectively by the end plate and by the opposite end wall of the housing rotatably support the motor shaft 123 which has at one end an extension 124 projecting into a gear box 125 mounted adjacent the closed end of the housing. A worm 126 on the shaft extension 124 coacts with a worm gear 127 (Fig. 7) keyed to a transverse shaft 128 which has one end projecting into the gear box 125. The shaft 128 is rotatably supported in laterally spaced arms 129 and 130 of a bracket 131 rigidly secured to the fixture body 21'.

A worm 132 fixed on the shaft 128 intermediate its ends coacts with a worm gear 133 nonrotatably secured to the rail structure 11 concentric with the pivotal axis of the fixture 20'. As shown in Fig. 6, the gear 133 is in the form of an annulus adapted to seat in a recess 134 in the inner face of the rail member 18. In the exemplary embodiment, the face portion of the member 18 is cut back to facilitate the machining of the recess 134 and a spacer plate 135 is interposed between the member and the adjacent face of the fixture body 21'. The gear 133 may be rigidly secured to the rail member by machine screws 136. Accordingly, when the shaft 128 is rotated, the worm 132 will travel around the stationary worm gear 133 and correspondingly turn the trunnion fixture 20' upon its pivot.

Suitable thrust bearings are provided for taking the end thrust of the shaft 128 when it is rotated to turn the trunnion fixture in either direction. As shown in Fig. 7, one thrust bearing 137 is interposed between the inner face of the bracket arm 129 and a spacer sleeve 138 bearing against the adjacent end of the worm 132. A second bearing 139 is interposed between the outer face of the arm 129 and a thrust washer 140 held against movement axially of the shaft 128 by a lock-nut assembly 141 threaded on the end of the shaft.

It will be apparent from the foregoing that the invention provides a power actuated swivel mounting for machine tool headstocks which affords a quick and accurate adjustment of the headstock with a minimum of physical effort on the part of the attendant and which permits the adjustment to be effected conveniently from a remote point. The swivel mounting is simple and rugged in construction and all wearing surfaces and moving parts are effectually enclosed and

I claim as my invention:

1. In a machine tool having a headstock and a support therefor including spaced side members, a fixture including a hollow generally rectangular body dimensioned to fit between said members, means on said body coacting with means on the headstock for supporting the latter for rotative adjustment, trunnions projecting from opposite sides of said body and journaled in recesses in said side members supporting said fixture for pivotal movement about an axis perpendicular to the rotative axis of the headstock, a worm gear secured to one side of said body with its axis coincident with the pivotal axis of said fixture, a shaft supported on one of said members having a worm cooperating with said gear, an electric motor mounted on said one member and having a worm and gear driving connection with said shaft, said one member being recessed to provide a chamber for completely enclosing said motor.

2. In a machine tool having a headstock support including spaced side members, a fixture including a hollow generally rectangular body supported between said members for pivotal movement, a headstock supported on said fixture for rotation about an axis substantially perpendicular to the pivotal axis of said fixture, power actuated means for rocking said fixture on its pivot to adjust the position of said headstock including a worm gear rigidly secured to the body of said fixture, a worm cooperating with said gear, a shaft for said worm, a bracket mounted on one of said members rotatably supporting said shaft, a reversible electric motor mounted on said one member and drivingly connected with said shaft, a sleeve on said shaft abutting one end of said worm, a first bearing interposed between said bracket and said sleeve, a collar rigid with said shaft, and a second bearing interposed between said bracket and said collar, said bearings absorbing the end thrust of said shaft when rotated in either direction.

3. In a machine tool having a headstock support including spaced side members, a fixture including a hollow generally rectangular body supported between said members for pivotal movement, power driven means for rocking said fixture on its pivot, a headstock including a housing having a flanged cylindrical extension, said fixture body having a cylindrical recess at one end for receiving said flanged extension whereby to support said headstock for rotation, an annular gear element secured within said extension, a shaft journaled in said fixture body having a pinion at one end meshing with said gear element, a reversible electric motor enclosed in said fixture body, and gearing drivingly connecting said motor with said shaft.

4. In a machine tool having a headstock and an elongated rail therefor including side members, a fixture including a hollow generally rectangular body dimensioned to fit between the side members of the rail, trunnions projecting from opposite sides of said body and journaled in bearings in the side members adjacent the ends of the rail supporting the fixture for pivotal movement about a horizontal axis, a headstock housing having a flanged cylindrical extension at one side, said fixture body having a cylindrical recess at one end for receiving said extension to support said headstock for rotation about an axis perpendicular to the pivotal axis of said fixture, and means controllable from a remote point for independently adjusting the angular position of said fixture relative to the rail and the angular position of said headstock relative to said fixture, said adjusting means comprising a worm gear secured to one side of the fixture body with its axis coincident with the pivotal axis of the fixture, a shaft supported on one of said rail members having a worm cooperating with said gear, an electric motor mounted on said one rail member having a worm and gear drive connection with said shaft, said one rail member being recessed to provide a chamber for completely enclosing said motor, an annular gear element fitted within and secured to the extension of the headstock housing, a second shaft journaled in said fixture body having a pinion at one end meshing with said gear element and operative to rotate the element and the headstock housing when the second shaft is rotatively driven, a second electric motor enclosed in said fixture body and drivingly connected with said second shaft, and control means for both of said motors operable from a central position.

EVERETT E. HOSEA.

REFERENCES CITED

The following references are of record in the file of this patent:

UNITED STATES PATENTS

| Number | Name | Date |
| --- | --- | --- |
| 514,719 | Libby | Feb. 13, 1894 |
| 515,988 | Bausch | Mar. 6, 1894 |
| 661,586 | Prentice | Nov. 13, 1900 |
| 973,695 | Philibert | Oct. 25, 1910 |
| 1,930,796 | Garbutt et al. | Oct. 17, 1933 |
| 2,042,720 | Lindner | June 2, 1936 |
| 2,215,369 | Gabriel | Sept. 17, 1940 |
| 2,275,291 | Bannow | Mar. 3, 1942 |
| 2,286,821 | Libby | June 16, 1942 |
| 2,307,222 | Johnson | Jan. 5, 1943 |